United States Patent [19]
Fowlkes et al.

[11] 3,731,817
[45] May 8, 1973

[54] FISHING ROD HOLDER

[75] Inventors: George V. Fowlkes; Richard Eugene Fowlkes, both of Tulsa, Okla.

[73] Assignee: Fo-Mac Enterprises, Inc., Tulsa, Okla.

[22] Filed: Mar. 31, 1971

[21] Appl. No.: 129,855

[52] U.S. Cl. ............................................211/60 R
[51] Int. Cl. ................................................A47f 7/00
[58] Field of Search ...................211/60, 120, 60 T, 211/60 G

[56] References Cited

UNITED STATES PATENTS

| | | | |
|---|---|---|---|
| 2,580,625 | 1/1952 | Waltz | 211/120 X |
| 3,483,996 | 12/1969 | Scammon | 211/60 G |
| 3,056,412 | 10/1962 | Wolfe | 211/60 R |
| D164,503 | 9/1951 | Kerr | 211/60 G |
| 3,155,299 | 11/1964 | Horne | 211/60 R X |
| 3,215,181 | 11/1965 | Reed | 211/60 G X |
| 3,487,947 | 1/1970 | Bogar | 211/60 R |
| 3,537,595 | 11/1970 | Mathisen | 211/60 R |

*Primary Examiner*—Nile C. Byers, Jr.
*Attorney*—William S. Dorman

[57] ABSTRACT

A fishing rod holder constructed primarily of weather resistant material, said material being flexible in either hot or cold weather, and particularly designed and constructed for the storage and protection of fishing equipment such as fishing rods and the like, in boats, campers, trailers, automobiles, and the like.

6 Claims, 8 Drawing Figures

Patented May 8, 1973

RICHARD E. FOWLKES
GEORGE V. FOWLKES
INVENTORS.

BY

William S. Dorman

ATTORNEY

RICHARD E. FOWLKES
GEORGE V. FOWLKES
INVENTOR.

BY
William S. Dorman
ATTORNEY

FISHING ROD HOLDER

This invention relates to improvements in fishing rod holders and storage equipment and more particularly but not by way of limiation to a fishing rod holder constructed of a weather resistant material for conveniently storing the fishing rod during periods of non-use.

Fishing rod holders are normally constructed in such a way as to require the use of both hands to install or release the fishing rod from the holder. The presently available rod holders which are constructed to allow one hand installation and release of the rod generally provide for the loose fitting of the fishing rod in the holder and said rod is subject to vibration when installed on a moving vehicle. This vibration is noisy and may result in damage to the fishing rod or to accidental loss thereof. Many presently available fishing rod holders use a closed aperture or hole at one support point which requires inserting the rod longitudinally therethrough, thus greatly limiting the space or area in which such holders may be installed.

The present invention contemplates a novel fishing rod holder designed and constructed to overcome the above disadvantages. The present invention is adaptable for use in boats, campers, trailers, station wagons, automobiles, cabins and the like with no modification necessary for changes in subject use. The present novel fishing rod holder is easily installed in any of the above applications and provides for holding the rods securely thereby reducing vibration and eliminating damage, and allowing installation and release of the fishing rod instantly with one hand. The installation and release of the rod is accomplished by transverse movement only and requires no longitudinal movement of the rod. The support elements of the present rod holders are constructed from a suitable weather resistant material whereby flexibility of said material is substantially unaffected by extreme temperature changes. The present invention is also suitable for use with a wide variety of fishing rods affording a maximum of protection and ready accessibility thereof. The present invention also encompasses optional rack mounting means whereby the rod holders will accept a single fishing rod or a plurality of fishing rods, said holder being easily installed on any wall surface or horizontal surface.

It is an important object of this invention to provide a fishing rod holder suitable for installation on a vehicle for facilitating storage of the rod.

It is another object of this invention to provide a fishing rod holder whereby installation and release of the fishing rods stored thereon may be accomplished by one hand.

It is still another object of this invention to provide a fishing rod holder constructed of a weather resistant material which is flexible and which retains its flexibility during extreme temperature changes.

It is also an object of this invention to provide a fishing rod holder which will accept a plurality of fishing rods, each of said rods being independently secured on the holder for substantially eliminating vibration or contact with the other rods.

Other and further objects and advantageous features of the present invention will hereinafter more fully appear in connection with a detailed description of the drawings in which.

Figure 1:
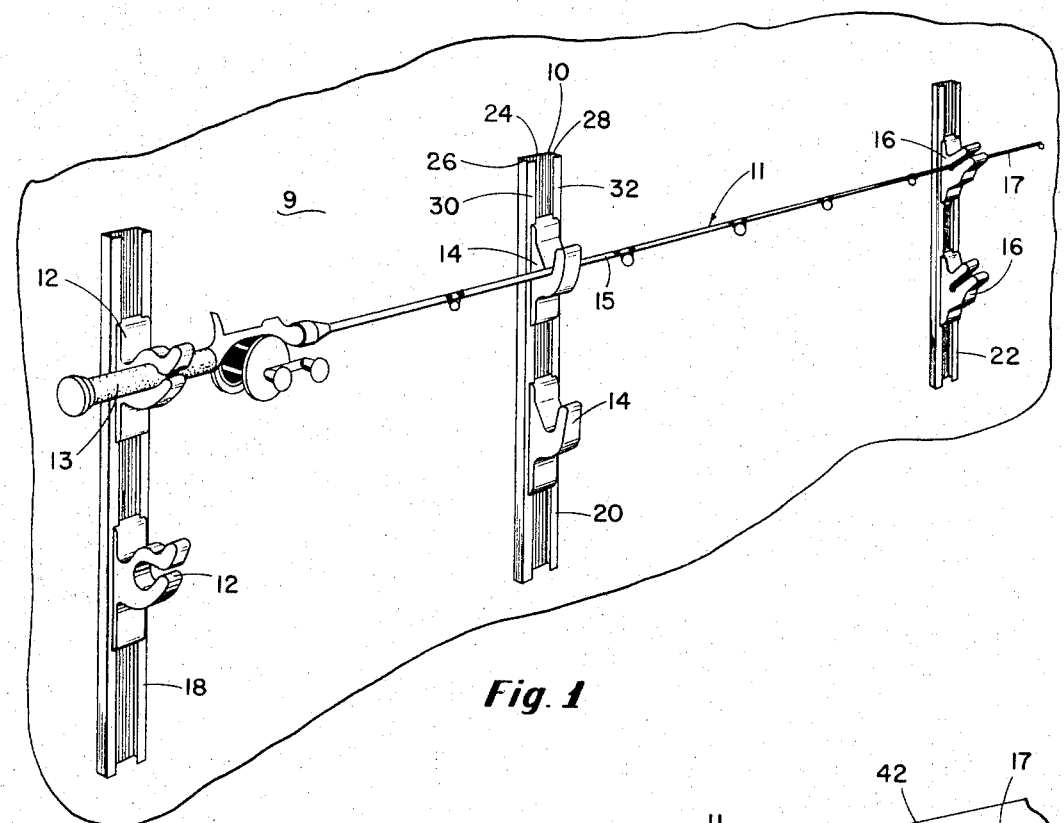
FIG. 1 is a perspective view of a wall mounted fishing rod holder embodying the invention.

Referring to the drawings in detail, and particularly FIG. 1, reference character 10 generally indicates a plurality of fishing rod holders as secured or mounted on a wall 9, such as the side of a boat (not shown), or the sidewall of a camper vehicle (not shown), or the like for supporting a fishing rod 11 during periods of non-use. Each fishing rod holder 10 comprises three spaced support members 12, 14 and 16 disposed in substantial alignment, as shown in the drawings. The first or handle receiving support member 12 is suitable secured or installed on the mounting surface 9 in a manner as will be hereinafter set forth, for receiving the fishing rod handle portion 13 therein. The second or rod mid-section receiving support member 14 is spaced from the handle receiving support member 12 for receiving the mid-section 15 of the fishing rod 11; and the third or rod tip end receiving support member 16 is spaced from the support member 14 for receiving the fishing rod tip end portion 17 therein.

Whereas the support members 12, 14 and 16 may be bolted or otherwise directly secured to the mounting surface 9, if desired, as shown in FIG. 1, a first substantially vertically disposed mounting rack 18 is bolted or otherwise secured to the surface 9 for slidably receiving one or a plurality of the support members 12 therein. The rack or channel member 18 is preferably of a substantially C-shaped cross-sectional configuration for facilitating securing of the support member or members 12 therein as will be hereinafter set forth. A second substantially identical bracket or mounting rack 20 is similarly secured to the mounting surface 9 in spaced relationship to the first rack 18 for slidably receiving one or more mid-section support members 14 therein. A third substantially identical mounting rack 22 is similarly secured to the mounting surface 9 in spaced relationship to the rack 20 for receiving one or more support members 16 therein. It will be apparent that the support members 12, 14 and 16 may be adjusted on the respective mounting racks 18, 20 and 22 to provide the desired alignment between the support members for efficiently supporting the fishing rod 11.

The rack mount 18 preferably comprises an elongated base portion 24 adapted for disposition against the surface 9. The base 24 is provided with side walls 26 and 28 extending substantially perpendicularly therefrom and oppositely disposed flange members 30 and 32 extend inwardly substantially at right angles with respect to the side walls 26 and 28, respectively, thus providing a channel or C-shaped member as hereinbefore set forth. The flanges 30 and 32 facilitate retaining of the support members 12 therein as will be hereinafter set forth.

The rack mount 18 preferably comprises an elongated base portion 24 having side walls 26 and 28 extending substantially perpendicularly therefrom and oppositely disposed flange members 30 and 32 extending inwardly substantially at right angles to the side walls 26 and 28, respectively, thus providing a channel or C-shaped member as hereinbefore set forth. The flanges 30 and 32 facilitate retaining of the support members when installed therein as will be hereinafter set forth.

Figure 2:
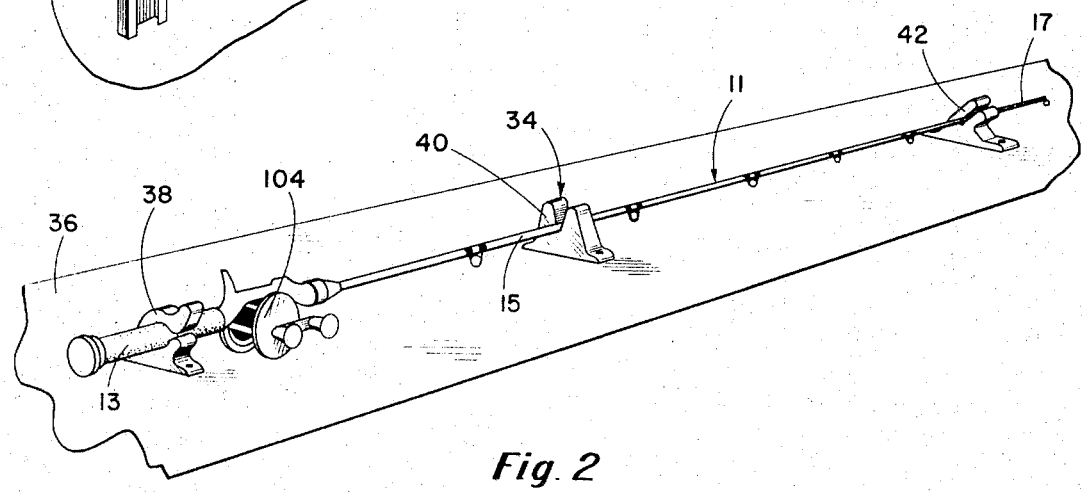
FIG. 2 is a perspective view of a horizontal surface mounted fishing rod holder embodying the invention.

Referring now to FIG. 2, reference character 34 generally depicts a fishing rod holder mounted on a horizontal surface 36 which may be a floor, table-top, boat gunnel, or the like. The fishing rod holder 34 comprises a first fishing rod handle receiving support member 38 secured to the horizontal surface 36 in any well known manner (not shown) for receiving the handle portion 13 of the fishing rod 11 therein; a second mid-section receiving support member 40 spaced from the support member 38 and similarly secured to the surface 36; and a third tip end receiving member 42 spaced from support member 34 and in alignment with the support members 38 and 40, similarly secured to the surface 36 for receiving the tip end portion 17 of the rod therein.

Figure 3:
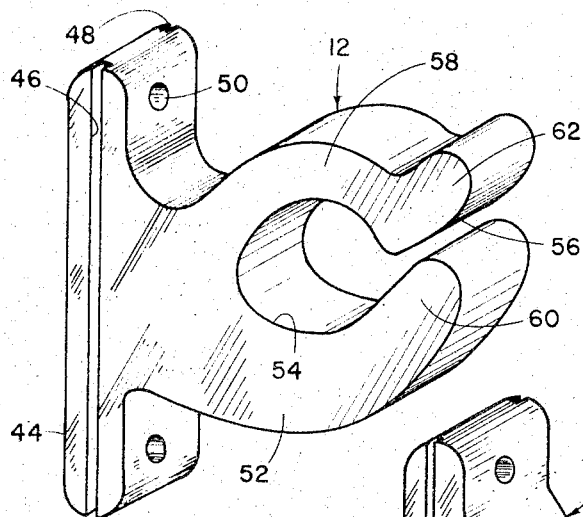
FIG. 3 is a perspective view of a fishing rod handle support member used in the wall mounting application of FIG. 1.

The support member 12, as shown in FIG. 3, is preferably molded or constructed from a suitable weather resistant material which is flexible in either hot or cold weather and comprises an elongated base portion 44 having a pair of oppositely disposed elongated grooves 46 and 48 provided in the sides thereof for slidably receiving the inwardly extending flanges 30 and 32 of the rack mount 18. The base portion 44 is also provided with a plurality of transverse mounting bores 50 for receiving bolts or the like (not shown) for mounting said support member 12 directly to the wall 9 without using the rack mount 18. A body member 52, preferably integral with the base 44 extends outwardly therefrom and is provided with a substantially circular aperture 54 therethrough. A slot 56 is provided in the body member 52 and extends from the outer edge thereof to the aperture 54 for transversely receiving the fishing rod handle 13 therethrough. The aperture 54 and the slot 56 combine to configure the body member 52 into an upper gripping arm 58 and a lower support arm 60 which cooperate to grip the fishing rod handle 13 when installed or disposed within the aperture 54. The arm 58 is further provided with a thumb lever portion 62 extending angularly outward from the gripping arm 58 whereby said gripping arm 58 may be lifted by the thumb for facilitating installation of or removal of the rod handle 13 therefrom.

Figure 4:
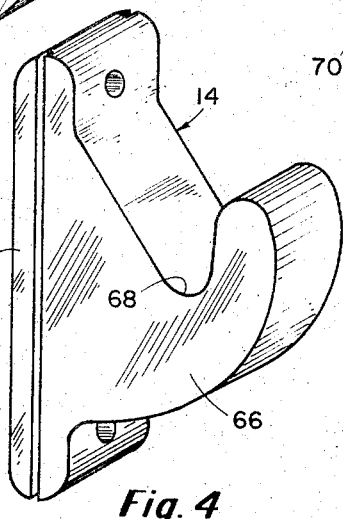
FIG. 4 is a perspective view of the fishing rod tip end support member used in the wall mounting application of FIG. 1.

The support member 14 is also preferably molded or constructed from the same material as that of the support member 12, and comprises an elongated base portion 64, substantially identical to the base portion 44 of the support member 12, for use with the rack mount 20 or for direct wall mounting with ordinary screws (not shown) as hereinbefore set forth. A body member 66, preferably integral with the base 64 extends outwardly therefrom and is provided with a substantially U-shaped groove 68 as shown in FIG. 4 for receiving and supporting the mid-section 15 of the fishing rod 11 therein.

Figure 5:
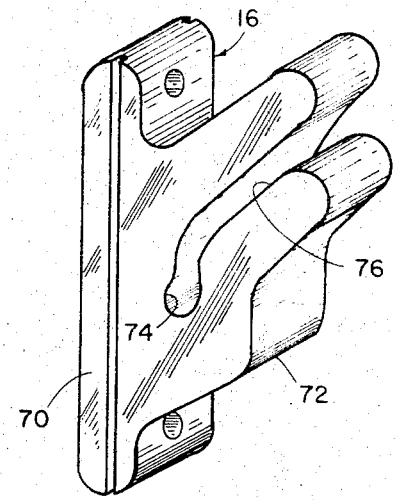
FIG. 5 is a perspective view of the fishing rod mid-section support member used in the wall mounting application of FIG. 1.

The support member 16 is preferably made of the same material as that of the members 12 and 14, and comprises a base portion 70 substantially identical to the base portions 44 and 64 of the support members 12 and 14, respectively, for use with the rack mount 22 or direct wall mounting with ordinary screws (not shown). A body member 72, preferably integral with the base 70, extends outwardly therefrom and is provided with a small circular aperture 74 extending therethrough as shown in FIG. 5. An arcuate or curved slot 76 is provided in the body member 72 and extends from the outer edge thereof at an angle and into the aperture 74 for transversely receiving the tip end portion 17 of the fishing rod 11 therethrough.

Figure 6:
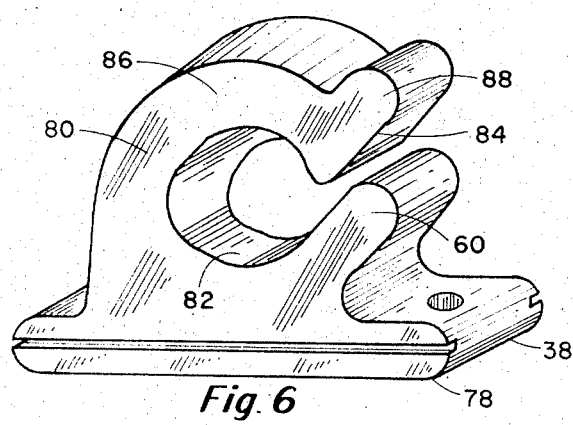
FIG. 6 is a perspective view of the fishing rod handle support member used in the horizontal surface mounting application of FIG. 2.

The support member 38, as shown in FIG. 6, is preferably made from the same material as that of the previously described support members and comprises an elongated base portion 78 substantially identical to the base portion of the previously described support members for rack mounting or direct mounting to the surface 36 (FIG. 2) with ordinary screws or bolts (not shown). A body member 80, preferably integral with the base 78, extends upwardly therefrom and is provided with an aperture 82 substantially identical to the aperture 54 of the support member 12. An angularly extending slot 84 is provided in the body member 80 and extends from the outer edge thereof to the aperture 82 for transversely receiving the fishing rod handle 13 therethrough. The aperture 82 and the slot 84 combine to configure the body member 80 into an upper gripping arm 86 and a lower support arm 87 which cooperate to grip the fishing rod handle 13 when disposed within the aperture 82. The arm 86 is further provided with a thumb lever portion 88 extending outwardly from the gripping arm 86 whereby the gripping arm 86 may be lifted by the thumb when installing or removing the fishing rod handle.

Figure 7:
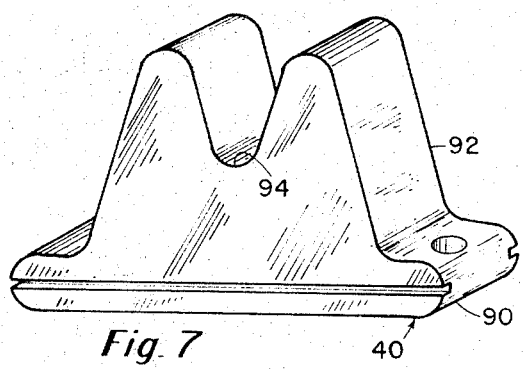
FIG. 7 is a perspective view of the fishing rod tip end support member used in the horizontal surface mounting application of FIG. 2.

The support member 40 (FIG. 7) is preferably suitably constructed from the same material as that of the support member 38 and comprises a base portion 90 substantially identical to the base portion 78 of the support member 38 for horizontal rack mounting or direct mounting to the surface 36 with ordinary screws or the like (not shown). A body member 92, preferably integral with the base 90, extends upwardly therefrom and is provided with a substantially U-shaped groove 94 for receiving and supporting the mid-section 15 of the fishing rod 11 therein.

Figure 8:
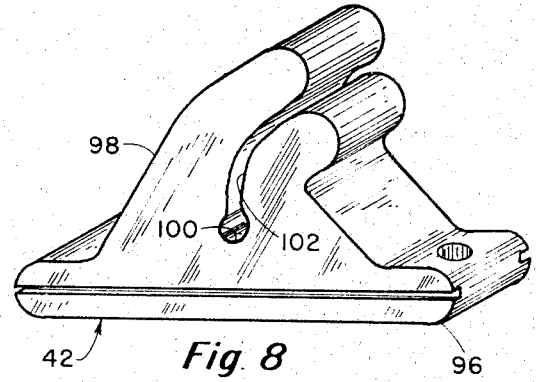
FIG. 8 is a perspective view of the fishing rod mid-section support member used in the horizontal surface mounting application of FIG. 2.

The support member 42 (FIG. 8) is preferably suitably molded or constructed from the same material as that of the support members 38 and 40 and comprises a base portion 96 substantially identical to the base portion 78 of the support member 38 for horizontal rack mounting or direct mounting to the surface 36 with ordinary screws or the like (not shown). A body member 98, preferably integral with the base 96, extends upwardly therefrom and is provided with a relatively small circular horizontal aperture 100 therethrough. A curved slot 102 is provided in the body member 98 and extends from the outer edge thereof inwardly and downwardly into the aperture 100 for transversely receiving the tip end 17 of the fishing rod 11 therethrough.

It is to be noted that the horizontally disposed support members 38, 40 and 42 may be used in a rack mount application, as set forth in connection with the supports 12, 14 and 16. In this instance, the rack mounts 18, 20 and 22 may be horizontally disposed and attached to the surface 36 in any well known manner (not shown) for slidably receiving one or more of the support members 38, 40 and 42, respectively, therein.

In addition, when the support members are used in conjunction with the rack mounting, said support members may be quickly and easily adjusted to provide room for virtually any size fishing reel 104 (FIGS. 1 and 2) which may be attached to the fishing rod 11.

Whereas the present invention has been described in particular relation to the drawings attached hereto, it should be understood that other and further modifications, apart from those shown or suggested herein, may be made within the spirit and scope of this invention.

What is claimed is:

1. A fishing rod holder for the storage of fishing rods having a handle portion and an elongated rod, and comprising a plurality of spaced support members disposed in substantial alignment with each other, said support members being constructed from a weather resistant resilient material which retains its flexibility and resilience in hot or cold weather, a first of said support members being provided with a slot type aperture for transversely receiving the fishing rod handle portion therein, said aperture being undersized with respect to the fishing rod handle portion disposed therein, a second of said support members being provided with a slot type aperture smaller than the first mentioned aperture for transversely receiving the outer end portion of the elongated rod therein, said second mentioned aperture being undersized with respect to the elongated rod portion disposed therein, and at least one support member interposed between the first and second support members and being provided with a substantially U-shaped groove for transversely receiving the mid section portion of the elongated rod therein whereby the resilient property of the material causes the fishing rod to be firmly gripped for eliminating excessive vibration thereof and whereby installation of the rod into and removal thereof from the fishing rod holder may be accomplished with one hand.

2. A fishing rod holder for the storage of fishing rods as set forth in claim 1 wherein the first said support member is provided with thumb release means for effecting quick one-hand installation and release of the fishing rod handle portion.

3. A fishing rod holder for the storage of fishing rods as set forth in claim 1 wherein each of the support members comprises an elongated horizontally disposed base portion, a body portion extending upwardly from the base portion, said body portion of the first support member being provided with a substantially circular transverse aperture therethrough and slot means extending downwardly and inwardly from the outer portion of the body into communication with the aperture for transversely receiving the handle portion therethrough and directing said handle portion into the aperture, and wherein the body portion of the second support member is provided with a relatively small substantially circular transverse aperture therethrough and arcuate slot means extending downwardly and inwardly from the outer portion of the body into communication with the said aperture for transversely receiving the outer end of the elongated rod therethrough and directing said outer end into the aperture, and wherein the body portion of the last mentioned support member is provided with a substantially downwardly extending U-shaped groove for transversely receiving the mid portion of the elongated rod member therein.

4. A fishing rod holder for the storage of fishing rods as set forth in claim 3 wherein the mounting means comprises a pair of oppositely disposed longitudinal grooves provided in the base portion of each said support member, and including a plurality of spaced horizontally disposed elongated rack mounts, each rack mount comprising an elongated base plate, a pair of side walls extending perpendicularly upward from the edges of the base plate, and inwardly extending flange member carried by each side wall for slidably receiving the support members therein, the said inwardly extending flange members in sliding engagement within the said longitudinal grooves.

5. A fishing rod holder for the storage of fishing rods as set forth in claim 1 wherein each of the support members comprises an elongated vertically disposed base portion having mounting means thereon, a body portion extending outwardly from the base portion, said body portion of the first support member being provided with a substantially circular transverse aperture therethrough and slot means extending downwardly and inwardly from the outer portion of the body into communication with the aperture for transversely receiving the handle portion therethrough and directing said handle portion into the aperture, and wherein the body portion of the second support member is provided with a relatively small substantially circular transverse aperture therethrough and arcuate slot means extending downwardly and inwardly from the outer portion of the body into communication with the said aperture for transversely receiving the outer end of the elongated rod therethrough and directing said outer end into the aperture, and wherein the body portion of the last mentioned support member is provided with a substantially downwardly extending U-shaped groove for transversely receiving the mid portion of the elongated rod member therein.

6. A fishing rod holder for the storage of fishing rods as set forth in claim 5 wherein the mounting means comprises a pair of oppositely disposed longitudinal grooves provided in the base portion of each said support member, and including a plurality of spaced horizontally disposed elongated rack mounts, each rack mount comprising an elongated base plate, a pair of side walls extending perpendicularly upward from the edges of the base plate, and inwardly extending flange member carried by each side wall for slidably receiving the support members therein, the said inwardly extending flange members in sliding engagement within the said longitudinal grooves.

* * * * *